United States Patent [19]

Lim et al.

[11] 3,876,594

[45] Apr. 8, 1975

[54] METHOD FOR PRODUCING OF ARTICLES FROM HYDROPHILIC POLYMERS APPROPRIATE FOR REPEATED OR LONG-TERM CONTACT WITH LIVING TISSUE OR MUCOUS MEMBRANE

[75] Inventors: Drahoslav Lim, Stanford, Calif.; Jindrich Kopecek, Prague, Czechoslovakia; Hedvika Bazilova, Nymburk, Czechoslovakia; Jiri Vacik, Prague, Czechoslovakia

[73] Assignee: Ceskoslovenska akademie ved, Prague, Czechoslovakia

[22] Filed: Aug. 17, 1972

[21] Appl. No.: 281,283

Related U.S. Application Data

[63] Continuation-in-part of Ser. No. 190,655, Oct. 19, 1971, abandoned.

[30] Foreign Application Priority Data

Oct. 20, 1970 Czechoslovakia.......................... 7065

[52] U.S. Cl. .................... 260/80.72; 3/1; 128/130; 204/159.23; 260/63 R; 260/79.3 MU; 260/80.3 R; 260/80.3 N; 260/80.3 E; 260/88.1 PA; 260/89.5 R

[51] Int. Cl. ............................................ C08f 19/00

[58] Field of Search... 260/79.3 MM, 88.3 R, 88.3 L, 260/88.1 PA, 80.3 N, 80.3 R, 80.72, 89.5 R, 63 R; 3/1

[56] References Cited
UNITED STATES PATENTS
2,893,970   7/1959   Caldwell ............................ 260/45.4

OTHER PUBLICATIONS

Ellies, J., Chim. Mod. 4, No. 26, 53-57 (1959) in Chem. Abst. 54, 6725.

Sorenson, W. R. et a., Preparitive Methods of Polymer Chemistry, Interscience Publ. Inc. N.Y. 1961, pg. 184.

*Primary Examiner*—Christopher A. Henderson
*Attorney, Agent, or Firm*—Murray Schaffer

[57] ABSTRACT

Method for producing articles suitable for repeated or long-term contact with living tissue or mucous membrane and which comprise hydrophilic polymers made by the polymerization of one addition monomer or at least two addition monomers with a small amount of crosslinking agent either with or without solvent. Heterocyclic compounds containing at least one > NH group in the molecule with hydrogen atom substituted by $CH_2=CH-CO-$ group are used as the main monomers in the polymerization charge, representing at least 50% of the monomeric charge.

4 Claims, No Drawings

METHOD FOR PRODUCING OF ARTICLES FROM HYDROPHILIC POLYMERS APPROPRIATE FOR REPEATED OR LONG-TERM CONTACT WITH LIVING TISSUE OR MUCOUS MEMBRANE

BACKGROUND OF THE INVENTION

This application is a continuation-in-part of copending application Ser. No. 190655, filed Oct. 19, 1971 now abandoned entitled *Method for Producing of Articles From Hydrophilic Polymers Appropriate for Repealed or Long-Term Contact With Living Tissue or Mucous Membrane.*

This application of non-organic hydrogels based on lightly or sparingly cross-linked polymers of glycol monomethacrylate or glycol monoacrylate for the production of contact lenses, protheses, implantates, coatings for probes or catheters, and the like where the main requirement is a good physiological tolerance and non-irritability of the polymer is known. It has been assumed, according to orientation tests with animals, that the analogous hydrogels with basic groups cause irritation of living tissue and do not heal well in such tissues.

Now, it has been found, that articles produced from hydrophilic gels by the method according to this invention do not irritate living tissue, heal well in such tissue and have good mechanical properties.

SUMMARY OF THE INVENTION

In accordance with the invention there is provided a method for producing articles which are suitable for repeated or long-term contact with living tissue or mucous membrane comprising the steps of charging a material selected from the group consisting of (1) one addition polymerizable monomer and (2) at least two addition polymerizable monomers in a mold of suitable configuration, the main monomer material, which is present in an amount of at least 50 mole percent of the monomer charge, being a heterocyclic compound containing at least one $>$NH group with the hydrogen atom of this group substituted with a $CH_2=CH-CO-$ group, such as N-acryloylmorpholine, N-acryloylthiomorpholine, or N-acryloylpyrrolidine; mixing a cross-linking agent with the monomer material, contacting the mixture with a free radical initiating system at polymerization temperature, polymerizing the mixture until polymerization is substantially complete and forming a shaped article in the mold.

DESCRIPTION OF THE PREFERRED EMBODIMENTS

The polymerization can advantageously be carried out either with or without solvent. Any material which is a solvent for both the monomers and polymers and which is miscible with water can be utilized. Exemplative solvents are water, the lower alcoholic, that is, those containing 1 to 4 carbon atoms, dimethyl formamide, dimethyl sulfoxide and the like.

The concentration of cross-linking agent is chosen according to the required degree of cross-linking. Consequently, this concentration is determined not only by the amount of the monomer which may have two or more functional groups in the molecule, but also by its type and ability to form the cross-linked polymer with the corresponding monomers under given circumstances. The less effective cross-linking agents have to be applied in a higher concentration than the more effective ones, which have an optimal concentration in the region of 0.1 to 2 mole percent. However, the concentration of a cross-linking agent may be higher or lower, extending in a range of from about 0.01 mole percent to about 50 mole percent. Suitable cross-linking agents are for instance N,N'-methylene-bis-acrylamide, N,N'-methylene-bis-methacrylamide, glycol dimethacrylate and the like. On the other hand, generally, any polymerizable compound having at least two vinylic groups can be used as a cross-linking agent. Such compounds include those having the formula:

wherein $n$ is an integer from 1 to 4 and,

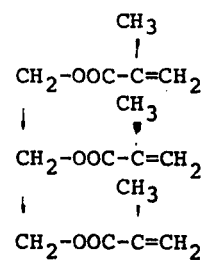

However, a cross-linking agent need not be of an acrylate or methacrylate type and materials such as divinyl benzene, trialkyl cyanurate, divinyl sulfone, triacryloyl perhydrotriazine, divinyl ketone, vinyl propenyl ketone and other greater than bifunctional monomers capable of polymerizing by free radicals can also be employed as cross-linking agents.

The aforesaid monomeric compounds may be polymerized alone, copolymerized either with one another or with other monomers, which polymerize and copolymerize by free radical initiated polymerization. Such useful materials include derivatives of acrylic and methacrylic acid such as the esters, amides, substitutes amides, nitrides, free acids and the like. The esters may also contain hetero groups such as,

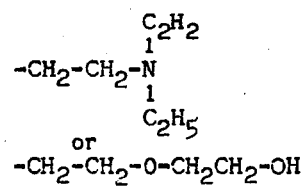

and the like.

Examples of suitable specific materials include methacrylonitrile, acrylonitrile, N,N'-disubstituted acrylamides, N-monosubstituted methacrylamides, N,N'-disubstituted methacrylamides, N-monosubstituted acrylamides and glycol methacrylates derived from various glycols, as ethyleneglycol, diethyleneglycol, triethyleneglycol, propyleneglycol, butyleneglycol and the like. By an appropriate choice of composition of the monomer mixture a broad selection of hydrophilic polymers can be prepared, that is, from lightly or sparingly cross-linked and highly swelling polymers which are vitreous liquids to polymers which are low-swelling in water. The hydrogels prepared according to the invention contain 5 to 95% of water, based on the polymer, in the equilibrium swollen state.

The monomers are generally employed in a concentration in a range of at least 50 mole percent to about 99.99 mole percent and generally more than 70 mole percent of the main monomer. When a mixture of monomers is employed the main monomer is always present in at least 50 mole percent.

Polymerization can be initiated by the common initiators used for free-radical polymerization, such as peroxides, hydroperoxides, peroxosulphates, substituted azo compounds and the like.

Irradiation with UV-light or with a source of visible light or daylight, if special initiators are used providing free radicals by an absorption of visible light and subsequent decay can also be employed.

The rate of polymerization is controlled by the concentration of the initiator according to the known equation $R_p \sim [I]^{1/2}$. The preferred range is $10^{-1}$ to $10^{-3}$ mole liter. The concentration of the initiator is also dependent upon the temperature of the polymerization which may vary widely. In general, the higher the temperature, the lower the concentration of initiator necessary.

The temperature is dependent on the type of initiator employed and, as mentioned, can vary widely from ambient or less to 80°C. or more. For example, in the case of axobis-isobutyronitrile, the preferred range is 40°C – 80°C. Where redox systems such as ammonium persulfate, a tertiary amine is employed as initiator, the preferred temperature range is 10°C. – 30°C. In contrast where ultraviolet light is used it is advantageous to polymerize at ambient temperature in the absence of initiator.

In order to illustrate this invention more fully the following illustrated examples are set forth. It is to be understood that the examples are illustrated and not limitative. In the Examples one parts and percents are by weight unless otherwise stated.

EXAMPLE I

Elastic corpuscles, appropriate for the filling of postoperational cavities, are prepared from an 80% aqueous solution of 89 mole percent of N-acryloylmorpholine and 10 mole percent of butyl methacrylate (weight ratio 8.9 : 1) containing 1 mole percent of ethylene-bis-methacrylamide and 0.05% of methyl azo-bis-isobutyrate, by heating in a mold to 60°C for 10 hours. After the polymerization was completed, the corpuscles where removed from the mold, thoroughly washed in the mixture ethanol-water 1 : 1, then in distilled water, and stored in a physiological saline solution.

EXAMPLE II

An 80% aqueous solution of N-acryloylmorpholine, containing 2 mole percent of triethyleneglycol dimethacrylate and 0.1% of hydrogen peroxide was heated for 10 hours to 70°C. After the polymerization was finished the finished the gel was thoroughly washed in distilled water and stored in a physiological saline solution.

EXAMPLE III

A thin polyester knitted fabric was inserted into a glass mold formed by two ground plates with spacers. The mold was charged at room temperature with the solution containing 80% of the mixture of 59.7 mole percent of N-acryloylpiperidine and 39.8 mole percent of N-hydroxyethylacrylamide (molar ratio 3 : 2), 0.5 mole percent of glycol dimethacrylate and 0.05% of di-isopropyl percarbonate in n-butanol. The solution was freed from air bubbles by the application of a vacuum and hammering and then polymerized by heating to 50°C for 10 hours. The reinforced foil formed was suitable as a substitute for peritoneum tissue.

EXAMPLE IV

A solution containing a 70% of the mixture of 56.9 mole percent of N-acryloylpyrrolidine and 42.6 mole percent of triethyleneglycol monomethacrylate (molar ratio 4 : 3), 1 mole percent of ethylene-bis-acrylamide and 0.05% of azo-bis-isobutyronitrile in n-butanol was heated for 8 hours to 65°C. The polymer formed was a hydrogel which when properly shaped could be employed for the same purpose as the products in the foregoing examples.

EXAMPLE V

A mixture of 86.8 mole percent of N-acryloylmorpholine and 12.4 mole percent of methyl methacrylate (molar ratio 7 : 1), containing 0.7 mole percent of glycol dimethacrylate and 0.1% of azo-bis-isobutyronitrile, was heated for 12 hours to 55°C. The polymer formed was a hydrogel which when properly shaped could be employed for the same purposes as those in the foregoing examples.

The method of this invention presents many advantages. For example, it is simple to carry out, employs materials which are readily available through normal commercial channels and can be achieved by use of existing apparatus.

In addition, products prepared by the method of this invention are suitable for repeated or long term contact with living tissue or mucous membrane and can be used in addition to the examples given above as contraceptive intrauteral corpuscles, cosmetic prostheses, and the like.

Moreover other advantages of this invention will be apparent to those skilled in the art. It is to be understood therefore, that this invention is not to be limited to the disclosed embodiment except as defined in the appended claims.

What is claimed is:

1. A method for producing non-soluble shaped articles of hydrophilic polymers suitable for repetitive or long term contact with living tissue or mucous membrane comprising the steps of charging a mold of suitable configuration with a monomer mixture comprising at least one addition polymerizable monomer, said one addition polymerizable monomer material being selected from the group consisting of N-acryloylmorpholine, N-acryloylpiperidine, N-acryloylthiomorpholine and N-acryloylphrrolidine and is present in an amount of at least about 50 mole percent, mixing a polyethylenically organic cross-linking agent with the monomer mixture, contacting the mixture with a free radical initiating system at polymerization temperature, polymerizing the mixture in said mold until polymerization is substantially complete and thereafter washing said article in water.

2. A method as defined in claim 1 wherein the cross-linking agent is employed in a range of from about 0.01 mole percent to about 2.0 mole percent.

3. A method as defined in claim 1 wherein the monomer mixture is dissolved in a solvent.

4. A method as defined in claim 1 wherein the polymerization is initiated with a free radical polymerization catalyst.

\* \* \* \* \*